United States Patent [19]

Milohanic

[11] Patent Number: 5,756,138
[45] Date of Patent: May 26, 1998

[54] APPARATUS AND PROCESS FOR ROLLING-UP SHEET MATERIAL

[75] Inventor: Slobodan Milohanic, Aengelholm, Sweden

[73] Assignee: Nestec S.A., Vevey, Switzerland

[21] Appl. No.: 638,296

[22] Filed: Apr. 26, 1996

[30] Foreign Application Priority Data

Apr. 28, 1995 [EP] European Pat. Off. ............ 95201095

[51] Int. Cl.[6] ................ A23P 1/00; A21C 11/00
[52] U.S. Cl. .......... 426/231; 99/450.1; 99/450.2; 425/374; 426/501; 426/512
[58] Field of Search .................. 426/500, 501, 426/512, 513, 231; 99/450.1, 450.2; 425/363, 374

[56] References Cited

U.S. PATENT DOCUMENTS

| | | | |
|---|---|---|---|
| 4,043,259 | 8/1977 | Sato | 99/450.1 |
| 4,954,064 | 9/1990 | Siegenthaler | 426/501 |
| 4,961,949 | 10/1990 | Barnes et al. | 426/500 |

FOREIGN PATENT DOCUMENTS 2242677  10/1991  United Kingdom.

*Primary Examiner*—George Yeung
*Attorney, Agent, or Firm*—Vogt & O'Donnell LLP

[57] ABSTRACT

A material sheet is conveyed to a hollowed pipe member which is rotatable about its longitudinal axis and which has one or more circumferential openings and which is positioned for, by vacuum suction via the pipe hollow and circumferential openings and by rotation, sucking up and rolling up the sheet. The pipe member is mounted so that it reciprocates transversely to the direction of sheet travel for positioning for sucking up and rolling up the sheet and for retracting from a rolled sheet on the conveyor.

19 Claims, 2 Drawing Sheets

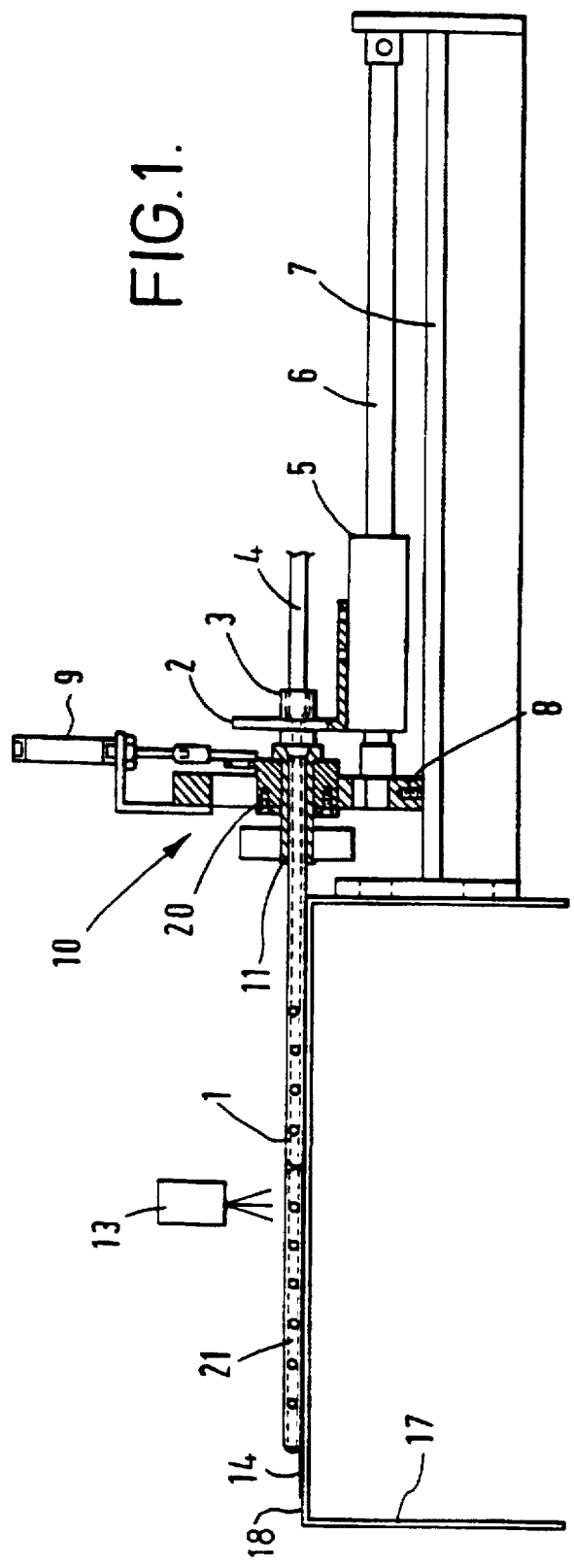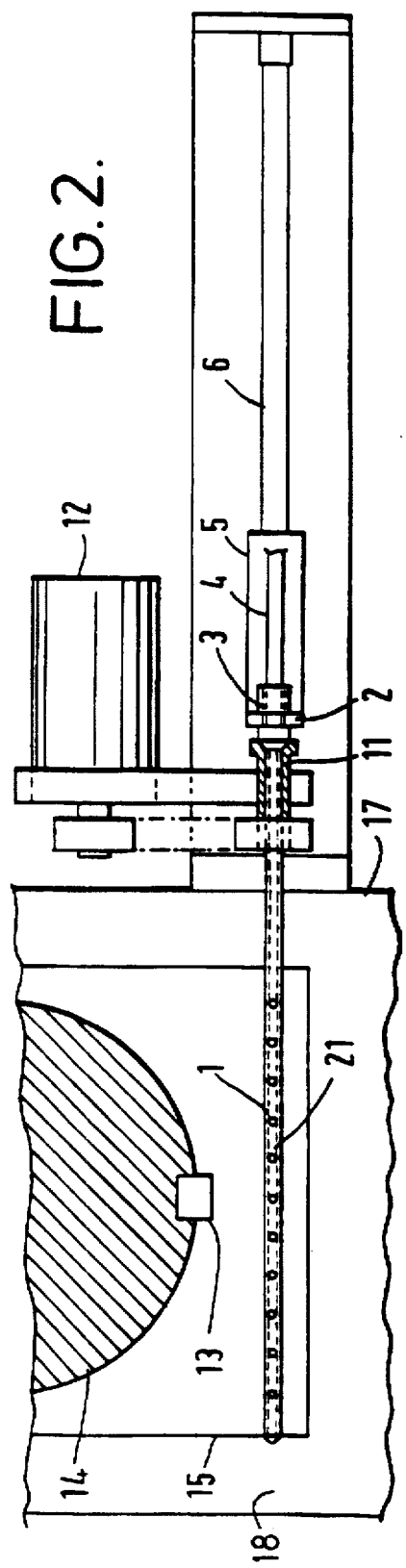

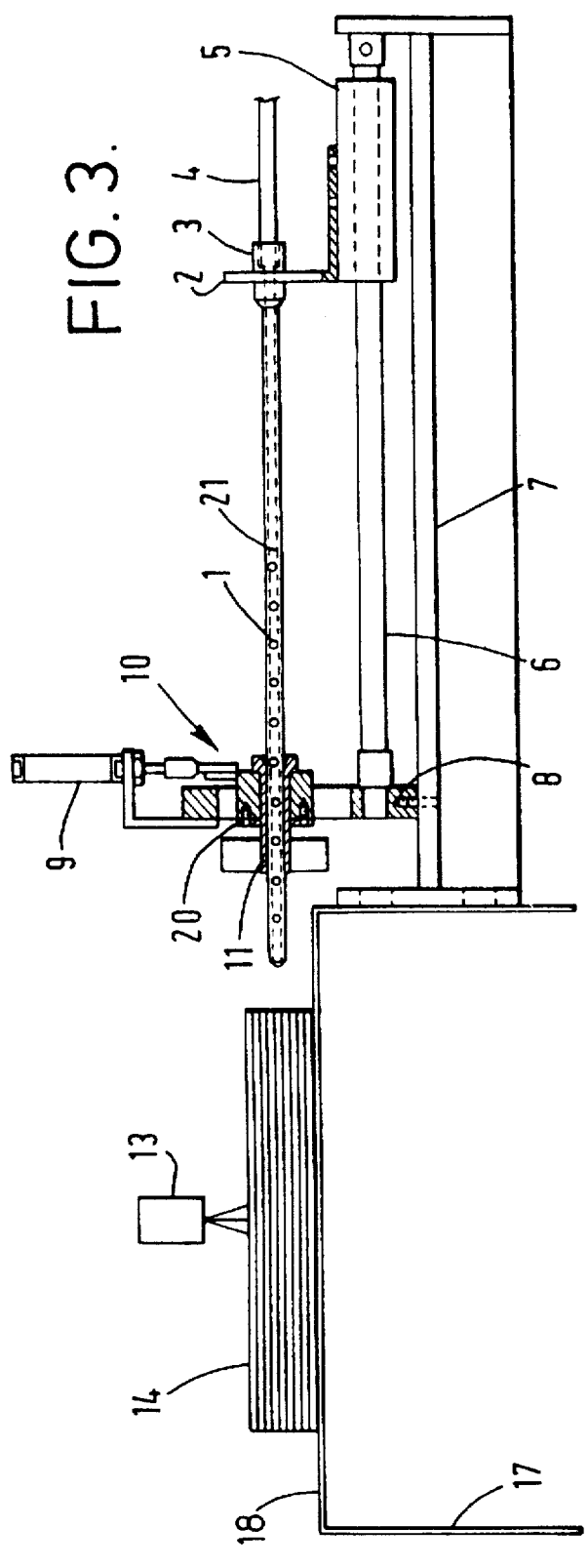
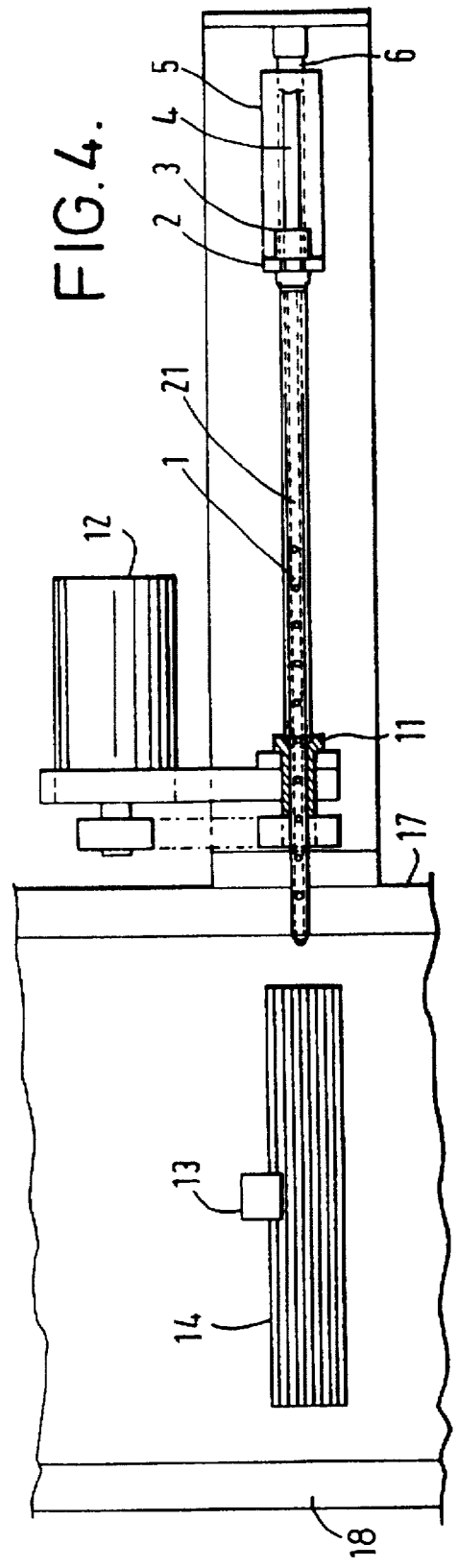

APPARATUS AND PROCESS FOR ROLLING-UP SHEET MATERIAL

BACKGROUND OF THE INVENTION

The present invention relates to an apparatus and method for rolling-up continuously moving sheet material, e.g. sheet food products such as dough, sliced meat, pasta sheets etc., positioned on carrier sheets.

The conventional way of rolling-up sheet material is by means of a mechanical seizing mechanism which is rotatable. This can for example be a rotating set of claws or a fork having a pair of pins which are introduced one on each side of the sheet and rotated so as to fix and roll-up the material around it. The seizing mechanism is then released and retracted from the roll. Alternatively, fixing of the sheet material can be performed by introducing one end of the sheet into a core element having a squeezing mechanism fastening the end. When the core element is rotated and the sheet material is rolled-up, the core element cannot be removed.

One of the major problems with rolling sheet material is to obtain a sufficiently tight roll while still being able to retract the device on which the sheet is rolled. For some purposes, such as reeling of paper, it is desirable to have a very tight roll, and therefore, the roll can be made leaving a core element in the centre. However, for the rolling of food products, such a core element is undesirable.

For purposes such as rolling of food material, e.g. dough, ham, and pasta, it is important to be able to fully control the tightness of the roll. The roll must not be too tight as this might result in difficulties with un-rolling, squeezing and stretching of the food material. This presents a special problem when the food product has a thickness of, for example, over 5 mm and is very soft. Especially when rolling dough products, e.g. pizza dough and pastry dough, care should be taken not to squeeze and stretch the product.

An up-rolling which is too loose may, on the other hand, present problems as the roll may tend to un-roll. Un-rolling is very undesirable as this requires supervision of the process and manual handling of the un-rolled rolls, for example in connection with packaging of the rolls.

Furthermore, difficulties are also experienced with the above mentioned mechanical seizing mechanisms, as the seizing of the sheet material is relatively slow and not always reliable resulting in prolonged roll-up time.

SUMMARY OF THE INVENTION

The present invention provides an apparatus and a method for rolling-up continuously moving sheet material which by means of a rotating vacuum pipe and pressurised air overcomes the above described problems and provides:

(a) a fast and secure seizing of the sheet material together with a quick release of the finished roll results in a short roll-up time. For example, a thin sheeted pasta dimension product (diameter 50 mm) may be rolled up in approximately 1.8 seconds.

(b) a rolling of the sheet material sufficiently tight to decrease the tendency of the roll to un-roll.

(c) an even and controlled tightness of the rolls which allows even soft and thick food sheet material to be satisfactorily rolled.

Furthermore, the invention presents a possibility of rolling more than one product at the time and an easy variation of the internal diameter of the roll, by using vacuum pipes of different diameters.

DETAILED DESCRIPTION OF THE INVENTION

In a first aspect, the present invention relates to an apparatus for rolling-up continuously moving sheet material, said apparatus comprising
- a hollow elongated vacuum pipe having at least one circumferential suction opening and being rotatably and reciprocatably mounted and connected to a vacuum supply,
- conveyor means for transporting the sheet material relative to the vacuum pipe,
- motion means for rotating the vacuum pipe about its longitudinal axis and for reciprocating the vacuum pipe to and from a position where the longitudinal axis is substantially parallel with the conveyor means and transverse to the direction of transportation of the sheet material, and
- control means for controlling the position of the sheet material and the movement of the vacuum pipe so that the sheet material is sucked to the suction opening, the vacuum pipe is rotated to roll-up the sheet material thereabout, the vacuum supply is switched off, and the vacuum pipe is retracted leaving the rolled sheet on the conveyor means.

It is preferred that the vacuum pipe reciprocates to and from a position above the conveyor means with the longitudinal axis of the pipe at a substantially right angle to the direction of transportation of the sheet material. In a preferred embodiment, this vacuum pipe comprises a cylinder defining the circumferential suction openings communicating with a bore therein having a cross-section at a right angle to the longitudinal axis of the cylinder which has an area substantially the same as the total area of the suction openings. The suction openings in the vacuum pipe may advantageously be a plurality of longitudinally spaced openings or alternatively one long suction slot. Conveniently, the openings should be spaced so that the full width of the sheet material is sucked to the vacuum pipe. Advantageously, the suction openings are positioned along a line parallel with the longitudinal axis of the vacuum pipe.

In a preferred embodiment of the invention, the leading edge of the sheet material is sucked to the vacuum pipe and the rest of the sheet material is rolled thereabout. However, the rolling may also take place when the trailing edge is first sucked to the vacuum pipe.

Advantageously, the vacuum pipe is further connected to a pressurised air supply which is turned on to secure a fast and easy release of the rolled sheet material from the vacuum pipe. Alternatively, the apparatus may be provided with mechanical means for securing the release of the roll.

For rolling of dough and other kinds of sticky food products, it is convenient that the product is placed on a support sheet and rolled together with and in between the product. For such purposes, it is preferred that the sheet food product is placed on a carrier sheet which, at least to the front and rear but preferably also at the sides, extends beyond the sheet food product. When rolling other products such as sliced meat or pasta sheets, the demand for a supporting and separating sheet is less, and it is often more desirable to present the products without interjacent sheets. Alternatively, the product and the carrier sheet may be partly overlapping so that only the last turn of the sheet food product is visible.

Interjacent sheets may be, e.g., sheets of paper or plastics film. For dough products which are to be baked directly with the carrier sheet, the sheet should preferably be baking paper.

To obtain an evenly tight roll, the vacuum pipe should conveniently descend before the sheet material is sucked to the vacuum pipe and ascends while up-rolling the sheet material. By displacing the vacuum pipe in this way during the rolling squeezing of the sheet material is also avoided.

To ensure a controlled position of the sheet material, especially when rolling light products, it may be desired that the apparatus according to the invention be provided with means for seizing to the conveyor means, e.g. by suction, the sheet material or carrier sheet being advanced towards the vacuum pipe.

It is also preferred that the rotation speed of the vacuum pipe is adjusted during the rolling operation. This makes the resulting rolls more evenly rolled. Evenly rolled rolls have been obtained with sheet material, e.g. dough on paper sheets, having a total thickness of 0.5 mm to about 10 mm, preferably from 6 to 8 mm.

In order to prevent un-rolling the rotation of the vacuum pipe should be stopped so that the rolls are positioned with the trailing edge of the sheet material facing the conveyor means.

In another aspect, the present invention provides a method for rolling-up continuously moving sheet material, said method comprising transporting sheet material relative to a hollow elongated vacuum pipe having at least one circumferential suction opening and being rotatably and reciprocatably mounted and connected to a vacuum supply, rotating the vacuum pipe about its longitudinal axis and reciprocating the vacuum pipe to and from a position where the longitudinal axis is substantially parallel with the conveyor means and transverse to the direction of transportation of the sheet material, while controlling the position of the sheet material and the movement of the vacuum pipe so that the sheet material is sucked to the suction opening, the vacuum pipe is rotated to roll-up the sheet material thereabout, the vacuum supply is switched off, and the vacuum pipe is retracted from the rolled-up sheet material.

Furthermore, the invention also relates to a sheet material comprising a sheet food product on a support or carrier sheet rolled in accordance with the method or apparatus of the invention.

The apparatus and method according to the invention may be used for rolling pastry dough, pizza dough, other kind of dough, sliced meet, pasta etc. It is nevertheless to be understood that the apparatus and method according to the invention may be suitable for the rolling of other products.

The invention is further described with reference to the drawings, which illustrate a preferred embodiment of an apparatus, according to the invention, performing a rolling of sheet material.

BRIEF DESCRIPTION OF THE DRAWINGS

FIG. 1 shows a diagrammatic side plan view of the apparatus according to the invention for rolling-up continuously moving sheet material at the beginning of the roll-up cycles.

FIG. 2 shows a diagrammatic top plan view of the apparatus in the same position.

FIG. 3 is a diagrammatic side plan view of the apparatus at the end of the roll-up cycles.

FIG. 4 shows a diagrammatic top plan view of this end position.

DETAILED DESCRIPTION OF THE DRAWINGS

Referring to the drawings, in particular, to FIGS. 1 and 3, an apparatus 10 according to the invention in this preferred embodiment comprises a hollow elongated vacuum pipe 1 having a plurality of longitudinal spaced circumferential openings 21, the pipe 1 dash lines of the drawing Figures define a pipe member inner surface which, in turn, defines a pipe hollow portion which, as illustrated, extends longitudinally, and the pipe 1 solid lines define a pipe member outer surface, and the circles of the drawing Figures in pipe 1 depict a wall portion which defines openings which extend from the pipe 1 outer surface to the inner surface to define wall portion openings which extend from the outer surface to the pipe 1 hollow portion. The number of openings 21 and the spacing thereof in the vacuum pipe 1 should be adapted to the width of the sheet material 14 (FIG. 1) or sheet materials 14, 15 (FIG. 2) to be rolled. Although as illustrated in FIG. 1, the pipe 1 does not extend across an entirety of the width of the sheet 14, preferably, the length of the vacuum pipe 1 should be longer than the width of the sheet material 14, 15. The vacuum pipe 1 is connected via a pipe opening to a vacuum pump (not shown in the drawings) via a flexible tube 4 having a vacuum connector 3.

The apparatus 10 further is provided with conveyor means 17 for transporting the sheet material 14 (FIG. 1) or materials 14, 15 (FIG. 2) beneath the pipe 1, the conveying means having a conveying run surface 18, which extends for a width between sides of surface 18, for transporting the sheet(s) in a direction aligned with the sides and hence, in alignment with the conveying run surface longitudinal extent.

As illustrated in FIG. 3, the vacuum pipe 1 is rotatably mounted in one end by means of a bearing bracket 20 having a rotary part 11 and in the other end by a support pipe bracket 2. As illustrated in FIGS. 1 and 3, the bearing bracket 20 is fixed to a housing 8. The housing is positioned on and mounted to a frame 7. The vacuum pipe 1 is rotated about its longitudinal axis by motion means, preferably by means of a program controlled stepping motor 12, such as shown in FIGS. 2 and 4.

Furthermore, as illustrated particularly in FIGS. 1 and 3, the vacuum pipe 1 is reciprocatably mounted to the housing by means of a linear drive cylinder having a fixed part 6 and a movable part 5. The movable part 5 is mounted to the pipe bracket 2. The motion is driven by the cylinder reciprocating the vacuum pipe 1 substantially horizontally to and from a position above and at a substantially right angle to the direction of transportation of the sheet material(s) (14 or 14 and 15).

For controlling the position of the sheet material 14, 15 and the movement of the vacuum pipe 1, the apparatus 10 also comprises control means. The control means controls so that the leading end of the sheet material is sucked to openings 21 in the vacuum pipe 1, the vacuum pipe is rotated to roll-up the sheet material around it, the vacuum supply is switched off, and the vacuum pipe 1 is retracted leaving the rolled sheet on the conveyor means 17. The control means may comprise sensors, 13 (FIGS. 1–4) detecting the position of sheet material, velocity of travel of conveying run surface 18 of conveyor 17, rotation speed and position of vacuum pipe, etc. Furthermore, the control means preferably controls the vacuum supply. The control means may advantageously employ a computer comprising a computer program controlling all steps in the rolling operation.

Preferably, the vacuum pipe 1 is connected to a presurised air supply via the flexible tube 4 which when turned on secures the release of the rolled sheet material by blowing pressurised air from the openings 21 in the vacuum pipe 1.

The operation of the release mechanism is controlled by the control means described above. A further and alternative way of ensuring release from the vacuum pipe is by performing a short reverse rotation of the vacuum pipe once the material has been up-rolled and before the vacuum pipe is retracted.

The diameter of the vacuum pipe 1 should advantageously be adapted to the product, e.g. have a diameter of 20 to 50 mm, suitable for rolling sliced meat such as ham. While the diameter for rolling dough should preferably be about 12 mm, the best and most even result is obtained if the vacuum pipe 1 is vertically displaceable so that it descends substantially horizontally before the sheet material is sucked thereto and ascends while up-rolling the sheet material. The apparatus 10 according to the invention may therefore be provided with motion means for example in the form of a cylinder 9 lifting and lowering the vacuum pipe and means for guiding the vacuum pipe in this movement, as illustrated in FIGS. 1 and 3. Alternatively, the motion means may comprise a contra, weight mechanism wherein displacement of a weight causes lifting and lowering of the vacuum pipe.

The rotation speed of the vacuum pipe and the velocity of the conveyor determine the tightness of the roll. Too tight up-rolling of dough will stretch it and is undesirable. In a preferred embodiment according to the invention, the velocity of the conveyor is from 7 to 10 m/min. and the rotation speed is about 25 rpm. For example, the rolling time of a 3 mm thick pizza dough of a diameter of 250 mm on a paper sheet having a length of 450 mm takes approximately 12 seconds when the conveyor velocity is 12 m/min. and the rotation speed is about 25 rpm. A thin pasta sheet (diameter 50 mm) may be rolled in approximately 1.8 seconds.

To keep the sheet material tightly rolled after rolling is completed, a bar may be provided across the conveyor making the rolls rotate on the spot. Conveniently, the rotation of the vacuum pipe should be controlled so that the rear end of the sheet of the roll should be facing downwardly during transportation to avoid un-rolling.

The apparatus 10 in FIGS. 1 to 4 operates so that during one cycle a paper sheet 15 with the sheet product 14 to be rolled is forwarded to a sensor 13, such as a photocell, which detects the position of the front edge of the paper sheet 15. The vacuum pipe is then moved forward from the position shown in FIGS. 3 and 4 to the position shown in FIGS. 1 and 2. The vacuum pipe 1 is rotated and preferably lowered towards the paper sheet 15, the vacuum pump (not shown in the drawings) is started and the vacuum pipe 1 catches and rolls-up the paper sheet 15 with the sheet product 14. The vacuum pipe 1 is preferably raised while the rolling is performed and while the rotation speed is adjusted in order to produce an evenly rolled roll. The photocell detects the end of the paper sheet 15 and the rotation stops and vacuum is switched off. Compressed air is blown through the vacuum pipe 1 from the compressed air supply (not shown in the drawings) and the vacuum pipe 1 is retracted to the position shown in FIG. 3 and 4 whereby the roll of the paper sheet 15 and the sheet product 14 is released. The apparatus is now ready for the next roll-up cycles.

I claim:

1. Apparatus for rolling up sheet material and comprising:
   conveying means which comprises a conveying run surface, which extends longitudinally between conveying run surface sides, for transporting a material sheet in a direction in alignment with the conveying run surface longitudinal extent;
   a pipe member comprising (a) a cylindrical outer surface which circumscribes a pipe member longitudinal axis, (b) an inner surface which defines a pipe member hollow portion which extends within the pipe member longitudinally to a pipe member opening and (c) a wall portion which defines an opening which extends from the outer surface through the pipe member to the inner surface to define a wall portion opening from the outer surface to the hollow portion;
   a tube connected with the hollow portion pipe member opening;
   a vacuum pump connected with the tube for effecting suction via the tube, the hollow portion and the outer surface opening;
   means for mounting the pipe member, means for rotating the pipe member and means for reciprocating the pipe member so that the pipe member is mounted so that the pipe member longitudinal axis extends transversely with respect to the conveying run surface sides, so that the pipe member is rotatable about the longitudinal axis, so that the pipe member is reciprocatable in opposing directions in alignment with the longitudinal axis and transverse to the conveying run surface sides and so that upon movement in one direction, the pipe member is moved from a first position to a second position so that the cylindrical surface extends across the conveying run surface in a direction from one conveying run surface side toward the other side for, upon drawing vacuum suction and rotation of the pipe member, sucking a material sheet on the conveying run surface from the conveying run surface to the pipe member outer surface and rolling up the sheet; and
   means for controlling the rotating means, the reciprocation means, the vacuum pump, and the movement of the conveying run surface for sucking and rolling up a material sheet from the conveying run surface and for retracting the pipe member from a rolled-up sheet, the means for controlling further comprising sensors for detecting a material sheet edge which extends between the conveying run sides on the conveying run surface, the speed of the rotating means, the conveying run surface travel velocity and the pipe member position for sucking and rolling up the material sheet.

2. Apparatus according to claim 1 further comprising means for additionally reciprocating the pipe member so that the pipe member is reciprocated additionally in opposing directions which are transverse to the circumferential surface longitudinal axis for increasing and decreasing a distance between the conveying run surface and the cylindrical outer surface and wherein the control means further controls the means for additionally reciprocating the pipe member.

3. Apparatus according to claim 1 or 2 further comprising a pressurized air supply connected with the pipe member to communicate with the hollow for supplying pressurized air via the hollow and the wall portion opening.

4. Apparatus according to claim 1 or 2 wherein there are a plurality of wall portions which extend from the outer surface to the inner surface and define a plurality of wall portion openings.

5. Apparatus according to claim 4 wherein the plurality of wall portion openings comprise an alignment of openings which is parallel to the longitudinal axis.

6. Apparatus according to claim 4 wherein the hollow portion comprises a pipe member cross-section area which is substantially the same as a total cross-section area of the plurality of wall portion openings.

7. Apparatus according to claim 5 wherein the hollow portion comprises a pipe member cross-section area which is substantially the same as a total cross-section area of the plurality of wall portion openings.

8. Apparatus according claim 1 wherein the conveying run surface is positioned and the pipe member is mounted so that the pipe member longitudinal axis is positioned at a right angle to the conveying run surface sides and wherein the conveying run surface extends horizontally.

9. Apparatus according to claim 1 further comprising means associated with the conveying run surface for seizing, in operation, sheet material to the conveying run surface at a position upstream of a position at which the sheet is rolled.

10. A process for rolling up a sheet of material comprising transporting a material sheet, which extends from a sheet leading edge for a length, on a conveyor run surface in a direction of the length of the sheet; moving a pipe member, which comprises a cylindrically-shapes outer surface having a longitudinal axis, a longitudinal hollow portion and at least one opening which extends from the hollow portion to the outer surface, from a first position in a direction transverse to the sheet transport direction to a second position for, upon pulling a vacuum for suction via the at least one opening which extends from the hollow portion, sucking up the sheet; detecting the sheet leading edge and pulling vacuum via the pipe member hollow portion and the at least one opening so that the sheet is sucked to the cylindrically-shaped outer surface and while sucking the sheet, rotating the pipe member about the longitudinal axis and transporting the sheet so that the pipe member rolls up the sheet about the outer surface; and upon completion of sheet rolling, ceasing the suction and reciprocating the pipe member to the first position to remove the pipe member from the rolled sheet.

11. A process according to claim 10 further comprising moving the pipe member in a direction away from the conveying run surface while rolling up the sheet.

12. A process according to claim 10 further comprising, during rolling, detecting a sheet trailing edge and controlling the rolling so that, upon completion of rolling the trailing edge faces the conveying run surface.

13. A process according to claim 10 further comprising, upon completion of rolling and ceasing suction, supplying pressurized air to the at least one opening via the pipe member hollow portion for releasing the rolled sheet from the pipe member outer surface.

14. A process according to claim 10 further comprising, prior to rolling, seizing the sheet to the conveying run surface while transporting the sheet.

15. A process according to claim 10 wherein the sheet is a food product.

16. A process according to claim 10 wherein the sheet is a first sheet and further comprising transporting a second material sheet together with the first sheet so that the first sheet is positioned upon the second sheet.

17. A process according to claim 16 wherein the first sheet is a food product.

18. A process according to claim 17 wherein the second sheet is a sheet of material selected from the group consisting of paper and plastic.

19. A process according to claim 16 wherein the second sheet has a length greater than the first sheet and wherein the first sheet edges are positioned upon the second sheet.

* * * * *

UNITED STATES PATENT AND TRADEMARK OFFICE
CERTIFICATE OF CORRECTION

PATENT NO. : 5,756,138
DATED : May 26, 1998
INVENTOR(S) : Slobodan MILOHANIC

It is certified that error appears in the above-indentified patent and that said Letters Patent is hereby corrected as shown below:

Column 4, line 18, change "material" to -- materials--.

Signed and Sealed this

Sixth Day of October, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,756,138
DATED : May 26, 1998
INVENTOR(S) : Slobodan MILOHANIC

It is certified that error appears in the above-indentified patent and that said Letters Patent is hereby corrected as shown below:

Column 7, line 14 (line 5 of claim 10), change "shapes" to -- shaped --.

Signed and Sealed this

Twenty-sixth Day of January, 1999

Attest:

Attesting Officer

*Acting Commissioner of Patents and Trademarks*